United States Patent
Dubelman et al.

(10) Patent No.: US 11,707,888 B2
(45) Date of Patent: Jul. 25, 2023

(54) METHOD AND APPARATUS FOR ADDITIVE MANUFACTURING WITH SHARED COMPONENTS

(71) Applicant: General Electric Company, Schenectady, NY (US)

(72) Inventors: Meredith Elissa Dubelman, Liberty Township, OH (US); Mary Kathryn Thompson, Hamilton, OH (US); Christopher Barnhill, Cincinnati, OH (US); Xi Yang, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/505,932

(22) Filed: Oct. 20, 2021

(65) Prior Publication Data
US 2022/0040921 A1 Feb. 10, 2022

Related U.S. Application Data

(62) Division of application No. 16/355,144, filed on Mar. 15, 2019, now Pat. No. 11,179,891.

(51) Int. Cl.
*B29C 64/245* (2017.01)
*B33Y 10/00* (2015.01)
(Continued)

(52) U.S. Cl.
CPC .......... *B29C 64/245* (2017.08); *B29C 64/129* (2017.08); *B29C 64/236* (2017.08);
(Continued)

(58) Field of Classification Search
None
See application file for complete search history.

(56) References Cited

U.S. PATENT DOCUMENTS

| | | |
|---|---|---|
| 4,575,330 A | 3/1986 | Hull |
| 4,752,498 A | 6/1988 | Fudim |

(Continued)

FOREIGN PATENT DOCUMENTS

| | | |
|---|---|---|
| CN | 107322930 | 11/2017 |
| DE | 102007010624 | 9/2008 |

(Continued)

OTHER PUBLICATIONS

Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa, Florida, US.

(Continued)

*Primary Examiner* — Yung-Sheng M Tsui
(74) *Attorney, Agent, or Firm* — Dinsmore & Shohl LLP

(57) ABSTRACT

An additive manufacturing machine includes: a resin support which has at least a portion which is transparent, wherein the resin support defines a build surface; a material depositor operable to deposit a resin which is radiant-energy-curable onto the build surface; at least two build stations, each build station including: a stage positioned adjacent the build zone and configured to hold a stacked arrangement of one or more cured layers of the resin; one or more actuators operable to manipulate a relative position of the stage and the build surface; and at least one radiant energy apparatus positioned opposite to the stage, and operable to generate and project radiant energy in a predetermined pattern.

20 Claims, 12 Drawing Sheets

(51) Int. Cl.
  *B33Y 30/00*     (2015.01)
  *B29C 64/264*    (2017.01)
  *B29C 64/236*    (2017.01)
  *B29C 64/129*    (2017.01)

(52) U.S. Cl.
  CPC ............ *B29C 64/264* (2017.08); *B33Y 10/00* (2014.12); *B33Y 30/00* (2014.12)

(56) References Cited

U.S. PATENT DOCUMENTS

| | | |
|---|---|---|
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,174,931 A | 12/1992 | Mmquist et al. |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,637 A | 8/1993 | Hull |
| 5,258,146 A | 11/1993 | Mmquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,496,682 A | 3/1996 | Quadir et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,697,043 A | 12/1997 | Baskaran et al. |
| 5,718,279 A | 2/1998 | Saoth et al. |
| 5,807,437 A | 9/1998 | Sachs et al. |
| 5,824,184 A | 10/1998 | Kamijo et al. |
| 5,851,465 A | 12/1998 | Bredt |
| 5,940,674 A | 8/1999 | Sachs et al. |
| 5,985,204 A | 11/1999 | Otsuka et al. |
| 6,051,179 A | 4/2000 | Hagenau |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,376,148 B1 | 4/2002 | Liu et al. |
| 6,401,002 B1 | 6/2002 | Jang et al. |
| 6,403,002 B1 | 6/2002 | van der Geest |
| 6,436,520 B1 | 8/2002 | Yamamoto |
| 6,471,800 B2 | 10/2002 | Jang et al. |
| 6,500,378 B1 | 12/2002 | Smith |
| 6,575,218 B1 | 6/2003 | Burns et al. |
| 6,596,224 B1 | 7/2003 | Sachs et al. |
| 6,780,368 B2 | 8/2004 | Liu et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,930,144 B2 | 8/2005 | Oriakhi |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,022,207 B2 | 4/2006 | Hirsch |
| 7,052,263 B2 | 5/2006 | John |
| 7,087,109 B2 | 8/2006 | Bredr et al. |
| 7,195,472 B2 | 3/2007 | John |
| 7,270,528 B2 | 9/2007 | Sherwood |
| 7,300,613 B2 | 11/2007 | Sano et al. |
| 7,351,304 B2 | 4/2008 | Liang et al. |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,572,403 B2 | 8/2009 | Gu et al. |
| 7,578,958 B2 | 8/2009 | Patel et al. |
| 7,614,866 B2 | 11/2009 | Sperry et al. |
| 7,636,610 B2 | 12/2009 | Schillen et al. |
| 7,698,947 B2 | 4/2010 | San |
| 7,706,910 B2 | 4/2010 | Hull et al. |
| 7,767,132 B2 | 8/2010 | Patel et al. |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,845,930 B2 | 12/2010 | Shkolnik et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 8,003,040 B2 | 8/2011 | El-Siblani |
| 8,029,642 B2 | 10/2011 | Hagman |
| 8,048,261 B2 | 11/2011 | McCowin |
| 8,071,055 B2 | 12/2011 | Newcombe |
| 8,096,262 B2 | 1/2012 | Ederer et al. |
| 8,105,066 B2 | 1/2012 | Sperry et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,191,500 B2 | 6/2012 | Dohring et al. |
| 8,211,226 B2 | 7/2012 | Bredt et al. |
| 8,282,866 B2 | 10/2012 | Hiraide |
| 8,326,024 B2 | 12/2012 | Shkolnik et al. |
| 8,372,330 B2 | 2/2013 | El-Siblani et al. |
| 8,394,313 B2 | 3/2013 | El-Siblani et al. |
| 8,424,580 B2 | 4/2013 | Anderson et al. |
| 8,444,903 B2 | 5/2013 | Lyons et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,568,646 B2 | 10/2013 | Wang et al. |
| 8,568,649 B1 | 10/2013 | Balistreri et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,658,076 B2 | 2/2014 | El-Siblani |
| 8,666,142 B2 | 3/2014 | Shkolnik et al. |
| 8,715,832 B2 | 5/2014 | Ederer et al. |
| 8,741,194 B1 | 6/2014 | Ederer et al. |
| 8,741,203 B2 | 6/2014 | Liska et al. |
| 8,761,918 B2 | 6/2014 | Silverbrook |
| 8,801,418 B2 | 8/2014 | El-Siblani et al. |
| 8,815,143 B2 | 8/2014 | John et al. |
| 8,844,133 B2 | 8/2014 | Fuller |
| 8,845,316 B2 | 9/2014 | Schillen et al. |
| 8,845,953 B1 | 9/2014 | Balistrer et al. |
| 8,873,024 B2 | 10/2014 | Jamar et al. |
| 8,876,513 B2 | 11/2014 | Lim et al. |
| 8,888,480 B2 | 11/2014 | Koo et al. |
| 8,915,728 B2 | 12/2014 | Mironets et al. |
| 8,926,304 B1 | 1/2015 | Chen |
| 8,932,511 B2 | 1/2015 | Napadensky |
| 8,968,625 B2 | 3/2015 | Tan |
| 8,991,211 B1 | 3/2015 | Arlotti et al. |
| 8,998,601 B2 | 4/2015 | Busato |
| 9,031,680 B2 | 5/2015 | Napadensky |
| 9,064,922 B2 | 6/2015 | Nakajima et al. |
| 9,067,359 B2 | 6/2015 | Rohner et al. |
| 9,067,361 B2 | 6/2015 | El-Siblani |
| 9,073,260 B2 | 7/2015 | El-Siblani et al. |
| 9,101,321 B1 | 8/2015 | Kiesser |
| 9,150,032 B2 | 10/2015 | Roof et al. |
| 9,205,601 B2 | 12/2015 | DeSimone et al. |
| 9,211,678 B2 | 12/2015 | DeSimone et al. |

(56) References Cited

U.S. PATENT DOCUMENTS

| | | | |
|---|---|---|---|
| 9,216,546 B2 | 12/2015 | DeSimone et al. | |
| 9,233,504 B2 | 1/2016 | Douglas et al. | |
| 9,248,600 B2 | 2/2016 | Goodman et al. | |
| 9,259,880 B2 | 2/2016 | Chen | |
| 9,308,690 B2 | 4/2016 | Boyer et al. | |
| 9,327,385 B2 | 5/2016 | Webb et al. | |
| 9,360,757 B2 | 6/2016 | DeSimone et al. | |
| 9,364,848 B2 | 6/2016 | Silverbrook | |
| 9,403,322 B2 | 8/2016 | Das et al. | |
| 9,403,324 B2 | 8/2016 | Ederer et al. | |
| 9,415,544 B2 | 8/2016 | Kerekes et al. | |
| 9,415,547 B2 | 8/2016 | Chen et al. | |
| 9,429,104 B2 | 8/2016 | Fuller | |
| 9,434,107 B2 | 9/2016 | Zenere | |
| 9,446,557 B2 | 9/2016 | Zenere et al. | |
| 9,453,142 B2 | 9/2016 | Rolland et al. | |
| 9,456,884 B2 | 10/2016 | Uckelmann et al. | |
| 9,457,374 B2 | 10/2016 | Hibbs et al. | |
| 9,463,488 B2 | 10/2016 | Ederer et al. | |
| 9,469,074 B2 | 10/2016 | Ederer et al. | |
| 9,486,944 B2 | 11/2016 | El-Siblani et al. | |
| 9,487,443 B2 | 11/2016 | Watanabe | |
| 9,498,920 B2 | 11/2016 | DeSimone et al. | |
| 9,511,546 B2 | 12/2016 | Chen et al. | |
| 9,517,591 B2 | 12/2016 | Yoo et al. | |
| 9,517,592 B2 | 12/2016 | Yoo et al. | |
| 9,527,244 B2 | 12/2016 | El-Siblani | |
| 9,529,371 B2 | 12/2016 | Nakamura | |
| 9,533,450 B2 | 1/2017 | El-Siblani et al. | |
| 9,539,762 B2 | 1/2017 | Durand et al. | |
| 9,545,753 B2 | 1/2017 | Costabeber | |
| 9,545,784 B2 | 1/2017 | Nakamura | |
| 9,561,622 B2 | 2/2017 | Das et al. | |
| 9,561,623 B2 | 2/2017 | El-Siblani et al. | |
| 9,578,695 B2 | 2/2017 | Jerby et al. | |
| 9,579,852 B2 | 2/2017 | Okamoto | |
| 9,581,530 B2 | 2/2017 | Guthrie et al. | |
| 9,592,635 B2 | 3/2017 | Ebert et al. | |
| 9,604,411 B2 | 3/2017 | Rogren | |
| 9,632,037 B2 | 4/2017 | Chen et al. | |
| 9,632,420 B2 | 4/2017 | Mlanic | |
| 9,632,983 B2 | 4/2017 | Ueda et al. | |
| 9,636,873 B2 | 5/2017 | Joyce | |
| 9,649,812 B2 | 5/2017 | Hartmann et al. | |
| 9,649,815 B2 | 5/2017 | Atwood et al. | |
| 9,670,371 B2 | 6/2017 | Pervan et al. | |
| 9,676,143 B2 | 6/2017 | Kashani-Shirazi | |
| 9,676,963 B2 | 6/2017 | Rolland et al. | |
| 9,682,166 B2 | 6/2017 | Watanabe | |
| 9,682,425 B2 | 6/2017 | Xu et al. | |
| 9,821,546 B2 | 11/2017 | Schaafsma et al. | |
| 9,862,146 B2 | 1/2018 | Driessen et al. | |
| 9,895,843 B2 | 2/2018 | Lobovsky et al. | |
| 9,901,983 B2 | 2/2018 | Hovel et al. | |
| 9,908,293 B2 | 3/2018 | Koo et al. | |
| 9,919,474 B2 | 3/2018 | Napadensky | |
| 10,000,023 B2 | 6/2018 | El-Siblani et al. | |
| 10,011,076 B2 | 7/2018 | El-Siblani et al. | |
| 2003/0180171 A1 | 9/2003 | Artz et al. | |
| 2008/0170112 A1 | 7/2008 | Hull et al. | |
| 2010/0003619 A1 | 1/2010 | Das et al. | |
| 2011/0089610 A1 | 4/2011 | El-Siblani et al. | |
| 2012/0195994 A1 | 8/2012 | El-Siblani et al. | |
| 2013/0140741 A1 | 6/2013 | El-Siblani et al. | |
| 2014/0103581 A1 | 4/2014 | Das et al. | |
| 2014/0239554 A1 | 8/2014 | El-Siblani | |
| 2014/0275317 A1 | 9/2014 | Moussa | |
| 2014/0319735 A1 | 10/2014 | El-Siblani et al. | |
| 2014/0322374 A1 | 10/2014 | El-Siblani et al. | |
| 2015/0004042 A1 | 1/2015 | Nimal | |
| 2015/0056365 A1 | 2/2015 | Miyoshi | |
| 2015/0102531 A1 | 4/2015 | El-Siblani et al. | |
| 2015/0104563 A1 | 4/2015 | Lowe et al. | |
| 2015/0140152 A1 | 5/2015 | Chen | |
| 2015/0145174 A1 | 5/2015 | Comb | |
| 2015/0165695 A1 | 6/2015 | Chen et al. | |
| 2015/0224710 A1 | 8/2015 | El-Siblani | |
| 2015/0231828 A1 | 8/2015 | El-Siblani et al. | |
| 2015/0231831 A1 | 8/2015 | El-Siblani | |
| 2015/0246487 A1 | 9/2015 | El-Siblani | |
| 2015/0301517 A1 | 10/2015 | Chen et al. | |
| 2015/0306825 A1 | 10/2015 | Chen et al. | |
| 2015/0321421 A1 | 11/2015 | Ding | |
| 2015/0355553 A1 | 12/2015 | Allanic | |
| 2016/0016361 A1 | 1/2016 | Lobovsky et al. | |
| 2016/0031010 A1 | 2/2016 | O'Neill et al. | |
| 2016/0046075 A1 | 2/2016 | DeSimone et al. | |
| 2016/0046080 A1 | 2/2016 | Thomas et al. | |
| 2016/0052205 A1 | 2/2016 | FrantzDale | |
| 2016/0059484 A1 | 3/2016 | DeSimone et al. | |
| 2016/0059485 A1 | 3/2016 | Ding et al. | |
| 2016/0082671 A1 | 3/2016 | Joyce | |
| 2016/0096332 A1 | 4/2016 | Chen et al. | |
| 2016/0107340 A1 | 4/2016 | Joyce | |
| 2016/0107387 A1 | 4/2016 | Ooba et al. | |
| 2016/0129631 A1 | 5/2016 | Chen et al. | |
| 2016/0193785 A1 | 7/2016 | Bell et al. | |
| 2016/0214327 A1 | 7/2016 | Uckelmann et al. | |
| 2016/0221262 A1 | 8/2016 | Das et al. | |
| 2016/0303798 A1 | 10/2016 | Mironets et al. | |
| 2016/0332386 A1 | 11/2016 | Kuijpers | |
| 2016/0361872 A1 | 12/2016 | El-Siblani | |
| 2017/0008234 A1 | 1/2017 | Cullen et al. | |
| 2017/0008236 A1 | 1/2017 | Easter et al. | |
| 2017/0021562 A1 | 1/2017 | El-Siblani et al. | |
| 2017/0028472 A1* | 2/2017 | Shaw | B22F 10/73 |
| 2017/0066185 A1 | 3/2017 | Ermoshkin et al. | |
| 2017/0066196 A1 | 3/2017 | Beard et al. | |
| 2017/0072635 A1* | 3/2017 | El-Siblani | B33Y 10/00 |
| 2017/0080641 A1 | 3/2017 | El-Siblani | |
| 2017/0087670 A1 | 3/2017 | Kalentics et al. | |
| 2017/0100895 A1 | 4/2017 | Chou et al. | |
| 2017/0100897 A1 | 4/2017 | Chou et al. | |
| 2017/0100899 A1 | 4/2017 | El-Siblani et al. | |
| 2017/0102679 A1 | 4/2017 | Greene et al. | |
| 2017/0113409 A1 | 4/2017 | Patrov | |
| 2017/0120332 A1 | 5/2017 | DeMuth et al. | |
| 2017/0120333 A1 | 5/2017 | DeMuth et al. | |
| 2017/0120334 A1 | 5/2017 | DeMuth et al. | |
| 2017/0120335 A1 | 5/2017 | DeMuth et al. | |
| 2017/0120336 A1 | 5/2017 | DeMuth et al. | |
| 2017/0120387 A1 | 5/2017 | DeMuth et al. | |
| 2017/0120518 A1 | 5/2017 | DeMuth et al. | |
| 2017/0120529 A1 | 5/2017 | DeMuth et al. | |
| 2017/0120530 A1 | 5/2017 | DeMuth et al. | |
| 2017/0120537 A1 | 5/2017 | DeMuth et al. | |
| 2017/0120538 A1 | 5/2017 | DeMuth et al. | |
| 2017/0123222 A1 | 5/2017 | DeMuth et al. | |
| 2017/0123237 A1 | 5/2017 | DeMuth et al. | |
| 2017/0136688 A1 | 5/2017 | Knecht et al. | |
| 2017/0136708 A1 | 5/2017 | Das et al. | |
| 2017/0165916 A1 | 6/2017 | El-Siblani | |
| 2017/0173865 A1 | 6/2017 | Dikovsky et al. | |
| 2017/0182708 A1 | 6/2017 | Lin et al. | |
| 2017/0190120 A1 | 7/2017 | Bloome et al. | |
| 2017/0276651 A1 | 9/2017 | Hall | |
| 2017/0284971 A1 | 10/2017 | Hall | |
| 2017/0291804 A1 | 10/2017 | Craft et al. | |
| 2017/0297108 A1 | 10/2017 | Gibson et al. | |
| 2017/0297109 A1 | 10/2017 | Gibson et al. | |
| 2018/0001567 A1 | 1/2018 | Juan et al. | |
| 2018/0043619 A1 | 2/2018 | Kim et al. | |
| 2018/0200948 A1 | 7/2018 | Kuijpers et al. | |
| 2018/0229436 A1 | 8/2018 | Gu et al. | |
| 2019/0315064 A1* | 10/2019 | Budge | B22F 12/67 |
| 2019/0344500 A1* | 11/2019 | Côté | B29C 64/182 |
| 2020/0290276 A1* | 9/2020 | Kune | B33Y 10/00 |

FOREIGN PATENT DOCUMENTS

| | | |
|---|---|---|
| EP | 3453521 | 3/2019 |
| JP | 2002370286 | 12/2002 |
| JP | 2003039564 | 2/2003 |
| JP | 2004257929 | 9/2004 |

(56) References Cited

FOREIGN PATENT DOCUMENTS

| WO | 9806560 | 2/1998 |
| WO | 2006077665 | 7/2006 |
| WO | 2017009368 | 1/2017 |
| WO | 2017100538 | 6/2017 |

OTHER PUBLICATIONS

Matthews et al., Diode-Based Additive Manufacturing of Metals Using an Optically-Addressable Light Valve, Optic Express Research Article, May 10, 2017, vol. 25, No. 10, Lawrence Livermore National Laboratory, Livermore, California, US.
Lee et al., Large-Area Compatible Laser Sintering Schemes with a Spatially Extended Focused Beam, www.mdpi.com/journal/micromachines. Article May 11, 2017, Micromachines, Seoul University, Seoul, Korea.
European Extended Search Report for EP Application No. 20161960.8 dated Aug. 5, 2020 (8 pages).
Chinese office action for application 202010174098.8 dated Aug. 25, 2021 (20 pages with English Translation).
Hafkamp et al., Mechatronics, 2018, https://doi.org/10.1016/j.mechatronics.2018.02.006, The Netherlands.

\* cited by examiner

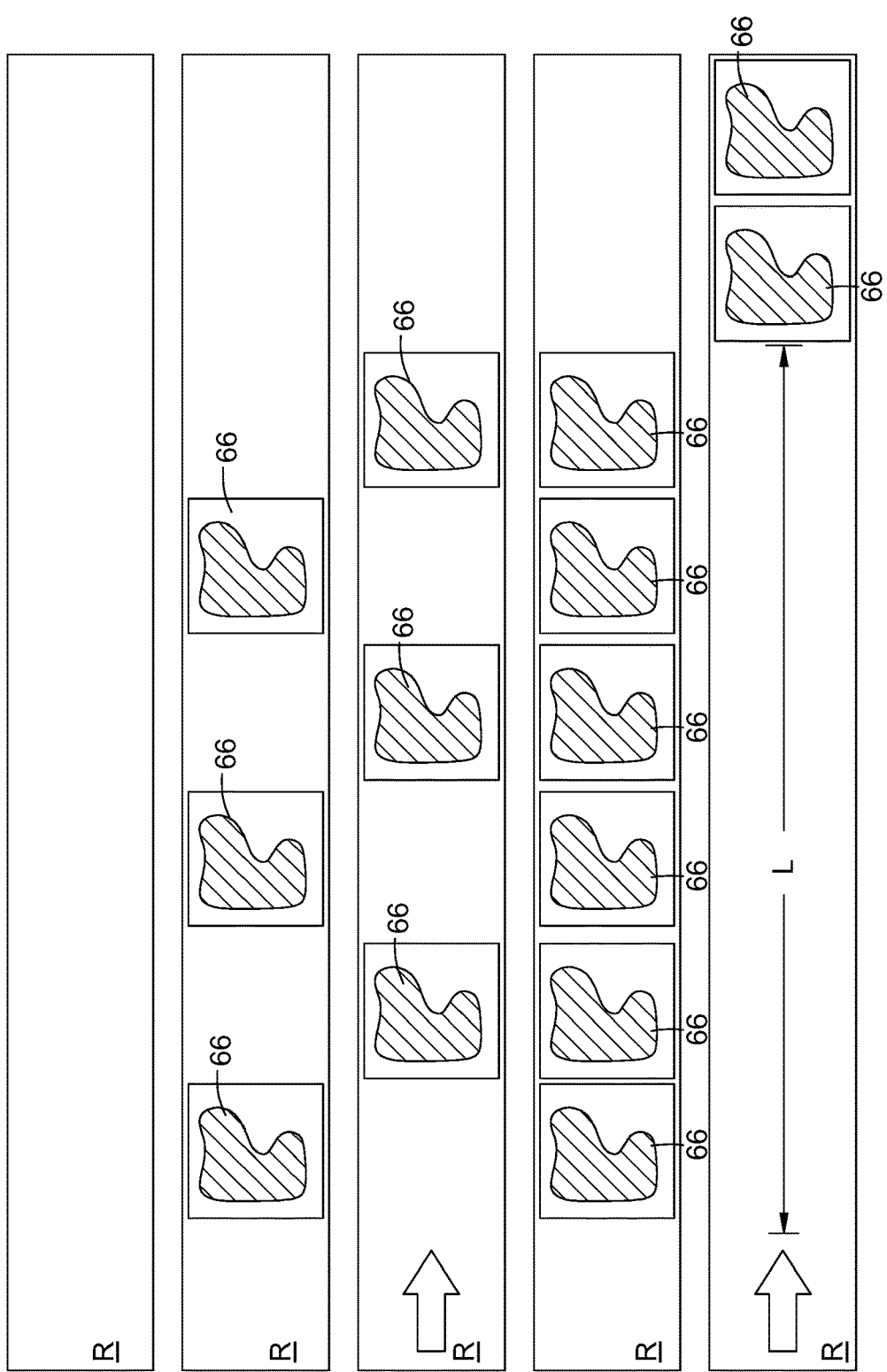

METHOD AND APPARATUS FOR ADDITIVE MANUFACTURING WITH SHARED COMPONENTS

CROSS-REFERENCE TO RELATED APPLICATIONS

This application is a divisional of U.S. patent application Ser. No. 16/355,144, filed on Mar. 15, 2019, which is hereby incorporated by reference in its entirety.

BACKGROUND OF THE INVENTION

This invention relates generally to additive manufacturing, and more particularly to methods and apparatus for additive manufacturing using multiple build stations with shared components.

Additive manufacturing is a process in which material is built up layer-by-layer to form a component. Stereolithography is a type of additive manufacturing process which employs a tank of liquid radiant-energy curable photopolymer "resin" and a curing energy source such as a laser. Similarly, DLP 3D printing employs a two-dimensional image projector to build components one layer at a time. For each layer, the projector flashes a radiation image of the cross-section of the component on the surface of the liquid or through a transparent object which defines a constrained surface of the resin. Exposure to the radiation cures and solidifies the pattern in the resin and joins it to a previously-cured layer. Other types of additive manufacturing processes utilize other types of radiant energy sources to solidify patterns in resin.

Another prior art method is a so-called "tape casting" process. In this process, a resin is deposited onto a flexible radiotransparent tape that is fed out from a supply reel. An upper plate lowers on to the resin, compressing it between the tape and the upper plate and defining a layer thickness. Radiant energy is used to cure the resin through the radiotransparent tape. Once the curing of the first layer is complete, the upper plate is retracted upwards, taking the cured material with it. The tape is then advanced to expose a fresh clean section, ready for additional resin.

One problem with existing additive manufacturing processes is that each machine has a limited physical capacity and requires multiple components, thus limiting the ability to scale up production economically.

BRIEF DESCRIPTION OF THE INVENTION

This problem is addressed by an additive manufacturing apparatus and method in which one or more of the components are shared by multiple build stations.

According to one aspect of the technology described herein, an additive manufacturing machine includes: a resin support which has at least a portion which is transparent, wherein the resin support defines a build surface; a material depositor operable to deposit a resin which is radiant-energy-curable onto the build surface; at least two build stations, each build station including: a stage positioned adjacent the build surface and configured to hold a stacked arrangement of the resin; one or more actuators operable to manipulate a relative position of the stage and the build surface; and at least one radiant energy apparatus positioned opposite to the stage, and operable to generate and project radiant energy in a predetermined pattern.

According to another aspect of the technology described herein, a method for producing a component layer-by-layer includes: providing a machine including: a resin support which has at least a portion which is transparent, wherein the resin support defines a build surface; and at least two build stations, each build station including: a stage positioned adjacent the build surface and configured to hold a stacked arrangement of one or more cured layers of a radiant-energy-curable resin; and one or more actuators operable to manipulate a relative position of the stage and the build surface; executing a build cycle, including the steps of: depositing on the build surface the resin, positioning the stages relative to the build surface so as to define a layer increment in the resin on the build surface; selectively curing the resin on the build surface using an application of radiant energy in a specific pattern so as to define the geometry of a cross-sectional layer of a component for each of the stages; moving the build surface and the stages relatively apart so as to separate the component from the build surface; and repeating the cycle, for a plurality of layers, until the components are complete.

According to another aspect of the technology described herein, an additive manufacturing machine includes: two or more resin supports, each resin support having at least a portion which is transparent, wherein each resin support defines a build surface; a material depositor operable to deposit a resin which is radiant-energy-curable onto the resin supports; a build station for each resin support, each build station including: a stage positioned adjacent the build surface and configured to hold a stacked arrangement of one or more cured layers the resin; one or more actuators operable to manipulate a relative position of the stage and the build surface; and a radiant energy apparatus disposed opposite to the stages and operable to generate and project radiant energy in a predetermined pattern; and means for delivering radiant energy from the radiant energy apparatus to each of the build stations.

According to another aspect of the technology described herein, a method for producing a component layer-by-layer includes: providing a machine including: two or more resin supports, each resin support having at least a portion which is transparent, wherein each resin support defines a build surface; a build station for each resin support, each build station including: a stage positioned adjacent the build surface and configured to hold a stacked arrangement of one or more cured layers of a radiant-energy-curable resin; one or more actuators operable to manipulate a relative position of the stage and the build surface; a radiant energy apparatus disposed opposite to the stages and operable to generate and project radiant energy in a predetermined pattern; and means for delivering radiant energy from the radiant energy apparatus to each of the build stations; executing a build cycle, including the steps of: depositing on the build surfaces the resin; positioning each of the stages relative to the corresponding build surfaces so as to define a layer increment in the resin on the build surface; selectively curing the resin on the build surface using an application of radiant energy in a specific pattern so as to define the geometry of a cross-sectional layer of a component for each of the stages; moving the build surfaces and the stages relatively apart so as to separate the components from the build surfaces; and repeating the cycle, for a plurality of layers, until the components are complete.

BRIEF DESCRIPTION OF THE DRAWINGS

The invention may be best understood by reference to the following description taken in conjunction with the accompanying drawing figures in which:

FIGS. 11A-11E are sequential top view schematic diagrams showing an additive build sequence;

DETAILED DESCRIPTION OF THE INVENTION

Figure 1:
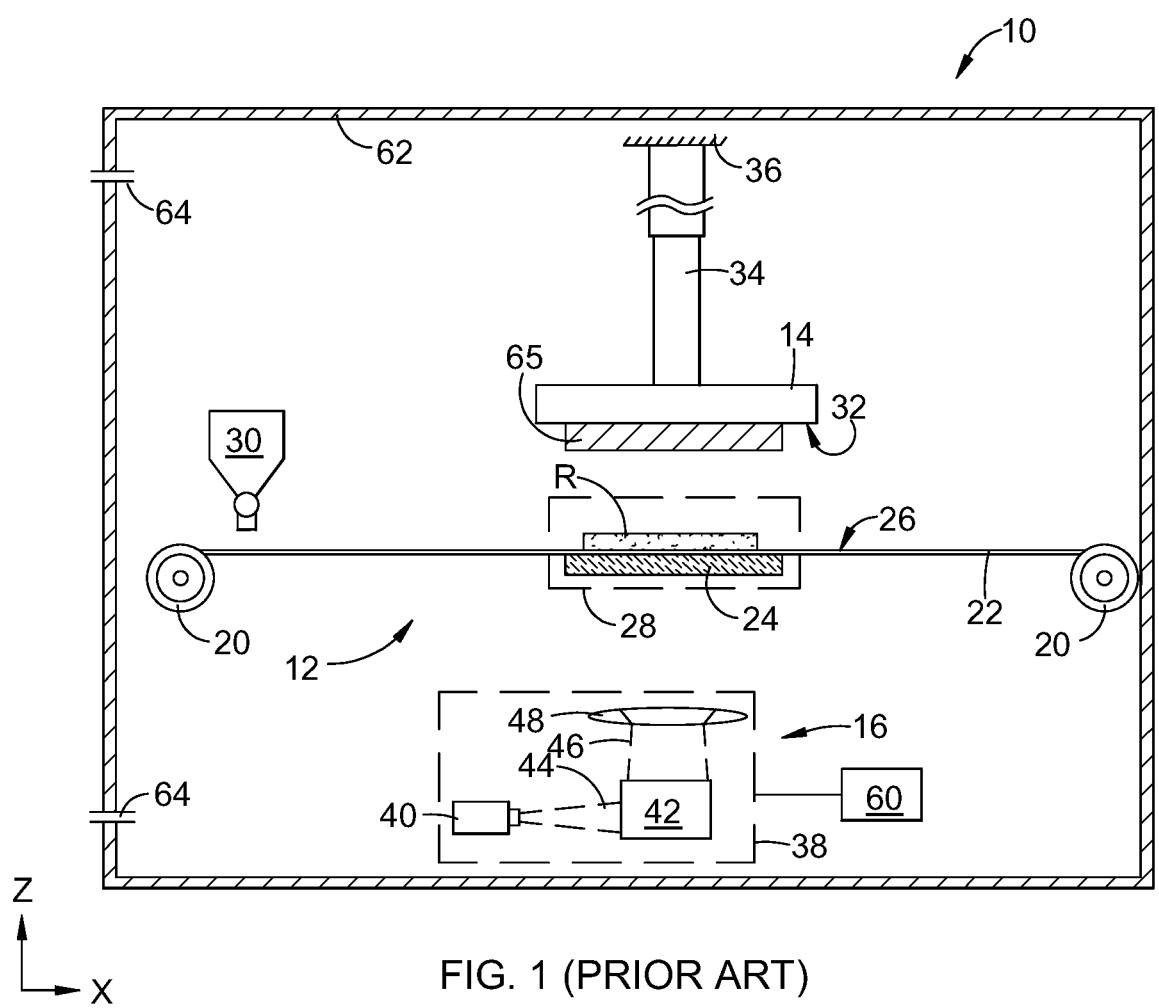
FIG. 1 is a schematic side view of an exemplary prior art additive manufacturing apparatus.

In general, an additive manufacturing machine includes a resin handling assembly, a stage, and a radiant energy apparatus. Several embodiments are disclosed herein, in which one or more of those components are shared for a plurality of build stations. Referring to the drawings wherein identical reference numerals denote the same elements throughout the various views, FIG. 1 illustrates schematically an example of one known type of additive manufacturing machine 10. Basic components of the exemplary machine 10 include a resin handling assembly 12, a stage 14, and a radiant energy apparatus 16.

In the illustrated example, the resin handling assembly 12 is a "tape casting"-type device. The resin handling assembly 12 includes spaced-apart rollers 20 with a flexible polymeric tape or foil 22 extending therebetween. A portion of the foil 22 is supported from underneath by a support plate 24. Suitable mechanical supports (frames, brackets, etc.—not shown) would be provided for the rollers 20 and support plate 24. The foil 22 is an example of a "resin support".

Both of the support plate 24 and the foil 22 are transparent or include a portion or portions that are transparent. As used herein, the term "transparent" refers to a material which allows radiant energy of a selected wavelength to pass through. For example, as described below, the radiant energy used for curing could be ultraviolet light or laser light in the visible spectrum. Non-limiting examples of transparent materials include polymers, glass, and crystalline minerals such as sapphire or quartz.

Appropriate means such as motors, actuators, feedback sensors, and/or controls of a known type (not shown) would be provided for driving the rollers 20 in such a manner so as to maintain the foil 22 tensioned between the rollers 20 and to wind the foil 22 from one of the rollers 20 to the other roller 20.

The foil 22 extending between the rollers 20 defines a "build surface" 26 which is shown as being planar, but could alternatively be arcuate (depending on the shape of the support plate 24). For purposes of convenient description, the build surface 26 may be considered to be oriented parallel to an X-Y plane of the machine 10, and a direction perpendicular to the X-Y plane is denoted as a Z-direction (X, Y, and Z being three mutually perpendicular directions).

The build surface 26 may be configured to be "non-stick", that is, resistant to adhesion of cured resin. The non-stick properties may be embodied by a combination of variables such as the chemistry of the foil 22, its surface finish, and/or applied coatings. In one example, a permanent or semi-permanent non-stick coating may be applied. One non-limiting example of a suitable coating is polytetrafluoroethylene ("PTFE"). In one example, all or a portion of the first build surface 26 may incorporate a controlled roughness or surface texture (e.g. protrusions, dimples, grooves, ridges, etc.) with nonstick properties. In one example, the foil 22 may be made in whole or in part from an oxygen-permeable material.

For reference purposes, an area or volume immediately surrounding the location of the foil 22 is defined as a "build zone", labeled 28.

Some means are provided for applying or depositing resin R to the build surface 26 in a generally uniform layer. FIG. 1 shows schematically a material depositor 30 which would be understood to include a reservoir for material communicating with the material outlet such as a slot or aperture (not shown). Conventional means such as a doctor blade (not shown) may be used to control the thickness of resin R applied to the foil 22, as the foil 22 passes under the material depositor 30.

The resin handling assembly 12 shown in FIG. 1 is merely an example. It will be understood that the principles described herein may be used with any type of resin support. Nonlimiting examples of such resin supports include foils, tapes, plates, and single-layer vats.

The stage 14 is a structure defining a planar upper surface 32 which is capable of being oriented parallel to the build surface 26. Some means are provided for moving the stage 14 relative to the resin handling assembly 12 parallel to the Z-direction. In FIG. 1, the movement means are depicted schematically as a simple vertical actuator 34 connected between the stage 14 and a static support 36, with the understanding that devices such as ballscrew electric actuators, linear electric actuators, pneumatic cylinders, hydraulic cylinders, or delta drives may be used for this purpose. In addition to, or as an alternative to, making the stage 14 movable, the foil 22 could be movable parallel to the Z-direction.

For the purposes of the present invention, the stage 14 and the associated movement means such as a vertical actuator 34 may be considered to be a "build station", referred to generally at reference numeral 35.

The radiant energy apparatus 16 may comprise any device or combination of devices operable to generate and project radiant energy on the resin R in a suitable pattern and with a suitable energy level and other operating characteristics to cure the resin R during the build process, described in more detail below.

In one exemplary embodiment as shown in FIG. 1, the radiant energy apparatus 16 may comprise a "projector" 38, used herein generally to refer to any device operable to generate a radiant energy patterned image of suitable energy level and other operating characteristics to cure the resin R. As used herein, the term "patterned image" refers to a projection of radiant energy comprising an array of individual pixels. Non-limiting examples of patterned imaged devices include a DLP projector or another digital micro-mirror device, a 2D array of LEDs, a 2D array of lasers, or optically addressed light valves. In the illustrated example, the projector 38 includes a radiant energy source 40 such as a UV lamp, an image forming apparatus 42 operable to receive a source beam 44 from the radiant energy source and generate a patterned image 46 to be projected onto the surface of the resin R, and optionally focusing optics 48, such as one or more lenses.

The radiant energy source 40 may comprise any device operable to generate a beam of suitable energy level and frequency characteristics to cure the resin R. In the illustrated example, the radiant energy source comprises a UV flash lamp.

The image forming apparatus 42 may include one or more mirrors, prisms, and/or lenses and is provided with suitable actuators, and arranged so that the source beam 44 from the radiant energy source 40 can be transformed into a pixelated image in an X-Y plane coincident with the surface of the resin R. In the illustrated example, the image forming apparatus 42 may be a digital micro-mirror device. For example, the projector 38 may be a commercially-available Digital Light Processing ("DLP") projector.

As an option, the projector 38 may incorporate additional means (not shown) such as actuators, mirrors, etc. configured to selectively move the image forming apparatus or other part of the projector 38, with the effect of rastering or shifting the location of the patterned image on the build surface 26. Stated another way, the patterned image may be moved away from a nominal or starting location. This permits a single image forming apparatus to cover a larger build area, for example. Means for mastering or shifting the patterned image from the image forming apparatus are commercially available. This type of image projection may be referred to herein as a "tiled image".

Figure 2:
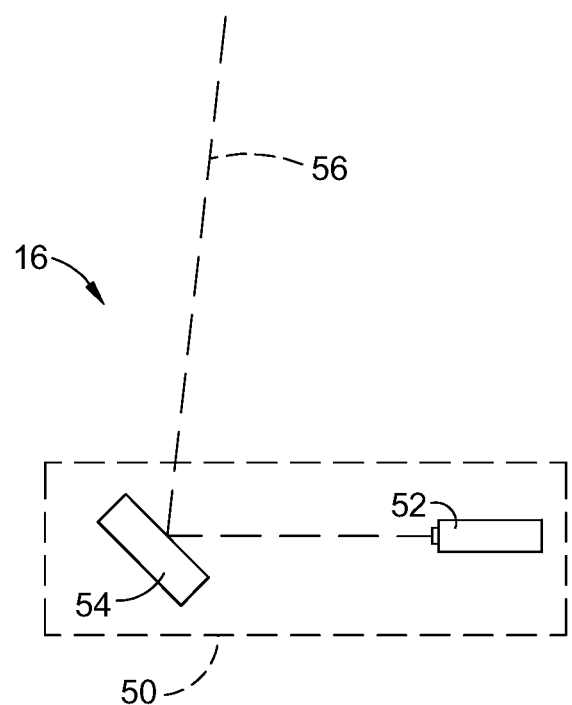
FIG. 2 is a schematic diagram of an alternative radiant energy apparatus for use with the additive manufacturing apparatus of FIG. 1.

In another exemplary embodiment as shown in FIG. 2, in addition to other types of radiant energy devices, the radiant energy apparatus 16 may comprise a "scanned beam apparatus" 50 used herein to refer generally to refer to any device operable to generate a radiant energy beam of suitable energy level and other operating characteristics to cure the resin R and to scan the beam over the surface of the resin R in a desired pattern. In the illustrated example, the scanned beam apparatus 50 comprises a radiant energy source 52 and a beam steering apparatus 54.

The radiant energy source 52 may comprise any device operable to generate a beam of suitable power and other operating characteristics to cure the resin R. Non-limiting examples of suitable radiant energy sources include lasers or electron beam guns.

The beam steering apparatus 54 may include one or more mirrors, prisms, and/or lenses and may be provided with suitable actuators, and arranged so that a beam 56 from the radiant energy source 52 can be focused to a desired spot size and steered to a desired position in plane coincident with the surface of the resin. The beam 56 may be referred to herein as a "build beam". Other types of scanned beam apparatus may be used. For example, scanned beam sources using multiple build beams are known, as are scanned beam sources in which the radiant energy source itself is movable by way of one or more actuators.

The machine 10 may include a controller 60. The controller 60 in FIG. 1 is a generalized representation of the hardware and software required to control the operation of the machine 10, including some or all of the resin handling assembly 12, the stage 14, the radiant energy apparatus 16, the imaging apparatus 18, and the various actuators described above. The controller 60 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the machine 10 may be subject to closed-loop control. For example, sensors could be used to monitor position, displacement, or movement of any of the components. Process sensors could be used to monitor output power or frequency characteristics of the radiant energy apparatus 16, or forces acting on the apparatus (e.g., stage 14 or foil 22). Imaging sensors (e.g. machine vision) could be used to observe the deposition or curing process. Information from any of the sensors could be used to monitor, control, or automate some or all of the operation of the machine 10, in conjunction with appropriate programming of the controller 60.

Optionally, the components of the machine 10 may be surrounded by a housing 62, which may be used to provide a shielding or inert gas atmosphere using gas ports 64. Optionally, pressure within the housing could be maintained at a desired level greater than or less than atmospheric. Optionally, the housing could be temperature and/or humidity controlled. Optionally, ventilation of the housing could be controlled based on factors such as a time interval, temperature, humidity, and/or chemical species concentration.

The resin R comprises a material which is radiant-energy curable and which is capable of adhering or binding together the filler (if used) in the cured state. As used herein, the term "radiant-energy curable" refers to any material which solidifies in response to the application of radiant energy of a particular frequency and energy level. For example, the resin R may comprise a known type of photopolymer resin containing photo-initiator compounds functioning to trigger a polymerization reaction, causing the resin to change from a liquid state to a solid state. Alternatively, the resin R may comprise a material which contains a solvent that may be evaporated out by the application of radiant energy. The uncured resin R may be provided in solid (e.g. granular) or liquid form including a paste or slurry.

The resin R is preferably a relatively high viscosity fluid that will not "slump" or run off during the build process. The composition of the resin R may be selected as desired to suit a particular application. Mixtures of different compositions may be used.

The resin R may be selected to have the ability to out-gas or burn off during further processing, such as the sintering process described below.

The resin R may incorporate a filler. The filler may be pre-mixed with resin R, then loaded into the material depositor 30. The filler comprises particles, which are conventionally defined as "a very small bit of matter". The filler may comprise any material which is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In one example, the filler composition may be selected for its electrical or electromagnetic properties, e.g. it may specifically be an electrical insulator, a dielectric material, or an electrical conductor. It may be magnetic.

The filler may be "fusible", meaning it is capable of consolidation into a mass upon via application of sufficient energy. For example, fusibility is a characteristic of many available powders including but not limited to: polymeric, ceramic, glass, and metallic.

The proportion of filler to resin R may be selected to suit a particular application. Generally, any amount of filler may be used so long as the combined material is capable of flowing and being leveled, and there is sufficient resin R to hold together the particles of the filler in the cured state.

Examples of the operation of the machine 10 will now be described in detail with reference to FIG. 1. It will be understood that, as a precursor to producing a component and using the machine 10, a component 65 is software modeled. e.g., in terms of a tool (energy source raster) path or as a stack of planar layers arrayed along the Z-axis. Depending on the type of curing method used, each layer may be divided into a grid of pixels. The actual component 65 may be modeled and/or manufactured as a stack of dozens or hundreds of layers. Suitable software modeling processes are known in the art.

Initially, the build zone 28 is prepared with resin R on the build surface 26. For example, the material depositor 30 may be used to deposit resin R over the build surface 26 of the foil 22.

Figure 3:
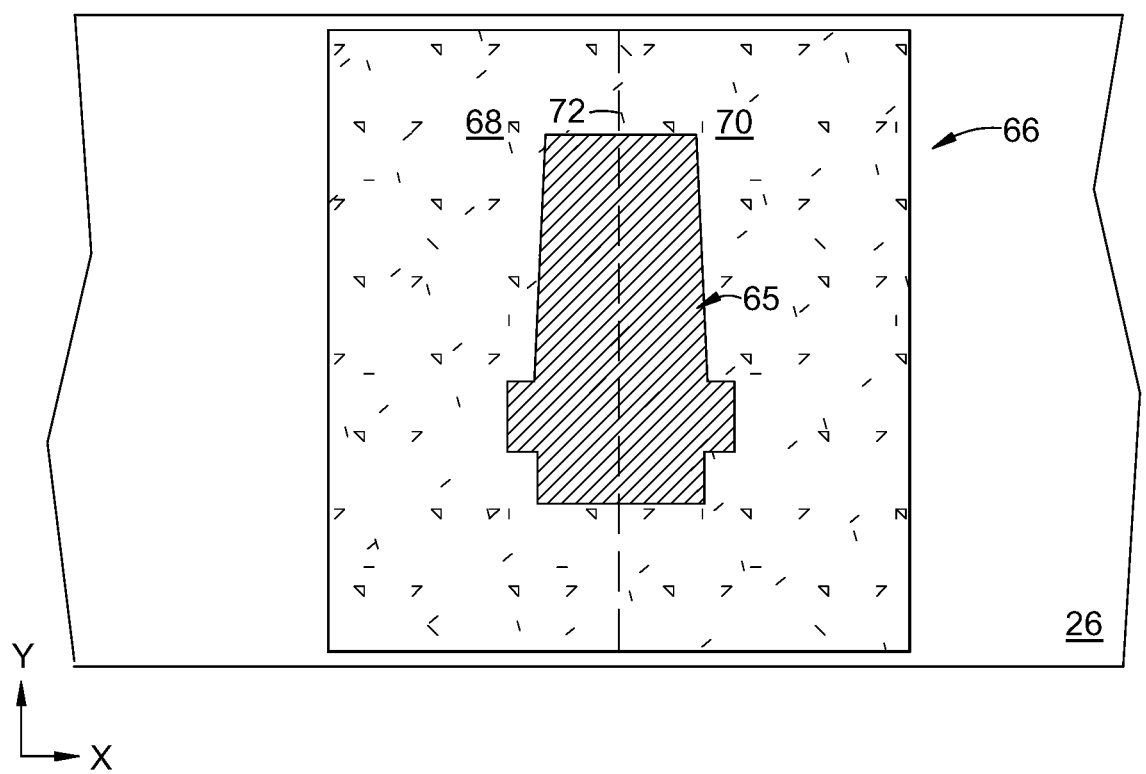
FIG. 3 is a schematic top plan view of a layer of a component being built.

Different materials may also be supplied to the build surface 26, at different times during the build (i.e. the material combination of the resin may be changed one or more times during the build). More than one material may also be supplied to different areas on a given build surface 26, at the same time. Optionally, any of the individual layers may comprise two or more material combinations. FIG. 3 illustrates an exemplary layer 66 showing a cross-section of the component 65 superimposed thereupon. The layer 66 is divided into a first section 68 including a first combination of resin R and filler, and a second section 70 including a second combination of resin R and filler. A dashed line 72 indicates the division between the two sections 68, 70. The shape, size, and number of sections, and number of different material combinations within a given layer may be arbitrarily selected. If multiple material combinations are used in one layer, then the deposition steps described above would be carried out for each section of the layer.

After the material is deposited, the machine 10 (or parts thereof) is configured or positioned to define a selected layer increment relative the build surface 26. The layer increment is defined by some combination of the thickness to which the resin R is applied and the operation of the stage 14. For example, the stage 14 could be positioned such that the upper surface 32 is just touching the applied resin R, or the stage 14 could be used to compress and displace the resin R to positively define the layer increment. The layer increment affects the speed of the additive manufacturing process and the resolution of the component 65. The layer increment can be variable, with a larger layer increment being used to speed the process in portions of a component 65 not requiring high accuracy, and a smaller layer increment being used where higher accuracy is required, at the expense of process speed.

Once the resin R has been applied and the layer increment defined, the radiant energy apparatus 16 is used to cure a two-dimensional cross-section or layer of the component 65 being built.

Where a projector 38 is used, the projector 38 projects a patterned image representative of the cross-section of the component 65 through the support plate 24 and foil 22 to the resin R. This process is referred to herein as "selective" curing. It will be understood that photopolymers undergo degrees of curing. In many cases, the radiant energy apparatus 16 would not fully cure the resin R. Rather, it would partially cure the resin R enough to "gel" and then a post-cure process (described below) would cure the resin R to whatever completeness it can reach. It will also be understood that, when a multi-layer component is made using this type of resin R, the energy output of the radiant energy apparatus 16 may be carefully selected to partially cure or "under-cure" a previous layer, with the expectation that when the subsequent layer is applied, the energy from that next layer will further the curing of the previous layer. In the process described herein, the term "curing" or "cured" may be used to refer to partially-cured or completely-cured resin R. During the curing process, radiant energy may be supplied to a given layer in multiple steps (e.g. multiple flashes) and also may be supplied in multiple different patterns for a given layer. This allows different amounts of energy to be applied to different parts of a layer.

Once curing of the first layer is complete, the stage 14 is separated from the build surface 26, for example by raising the stage 14 using the vertical actuator 34. It will be understood that the resin R and/or cured layer do not necessarily join, stick, or bond with the build surface 26. Accordingly, as used herein the term "separate" refers to the process of moving two elements apart from each other and does not necessarily imply the act of breaking a bond or detaching one element from another.

Subsequent to separation, the build surface 26 may be cleaned or otherwise rejuvenated and prepared for re-use. For example, advancing the foil 22 provides a clean surface. As the foil 22 advances, the material depositor 30 would be used to apply resin R to the build surface 26 to ready it for curing again.

After separation, the component 65 and/or the stage 14 may be cleaned to remove uncured resin R, debris, or contaminants between curing cycles. The cleaning process may be used for the purpose of removing resin R that did not cure or resin R that did not cure enough to gel during the selective curing step described above. For example, it might be desired to clean the component 65 and/or the stage 14 to ensure that no additional material or material contamination is present in the final component 65. For example, cleaning could be done by contacting the component 65 and/or the stage 14 with a cleaning fluid such as a liquid detergent or solvent.

This cycle of preparing the build surface 26, optionally imaging deposited resin R, incrementing a layer, selectively curing, separating the component 65 from the build surface 26, imaging the resin R and cleaning the component 65 and/or stage 14 would be repeated as necessary until the entire component 65 is complete.

Where a scanned beam apparatus is used for the build cycle described above, instead of a projector, the radiant energy source 52 emits a build beam 56 and the beam steering apparatus 54 is used to cure the resin R by steering a focal spot of the build beam 56 over the exposed resin R in an appropriate pattern.

Optionally, a scanned beam apparatus may be used in combination with a projector. For example, a scanned beam apparatus may be used to apply radiant energy (in addition to that applied by the projector) by scanning one or multiple beams over the surface of the uncured resin R. This may be concurrent or sequential with the use of the projector.

Either curing method (projector or scanned) results in a component 65 in which the filler (if used) is held in a solid shape by the cured resin R. This component may be usable as an end product for some conditions. Subsequent to the curing step, the component 65 may be removed from the stage 14.

If the end product is intended to be composed of the filler (e.g. purely ceramic, glass, metallic, diamond, silicon, graphite, etc.), the component 65 may be treated to a conventional sintering process to burn out the resin R and to consolidate the ceramic or metallic particles. Optionally, a known infiltration process may be carried out during or after the sintering process, in order to fill voids in the component with a material having a lower melting temperature than the filler. The infiltration process improves component physical properties.

The above-described machine 10 incorporates a single build station 35. The productivity of an additive manufacturing machine may be increased and its cost and complexity may be decreased using an apparatus of the same general type in which multiple build stations 35 are provided, such that the apparatus can form multiple layers simultaneously, where the multiple build stations 35 share at least one component of the overall machine.

In one basic embodiment, an additive manufacturing machine includes a plurality of build stations 35 sharing a common resin support.

Figure 4:
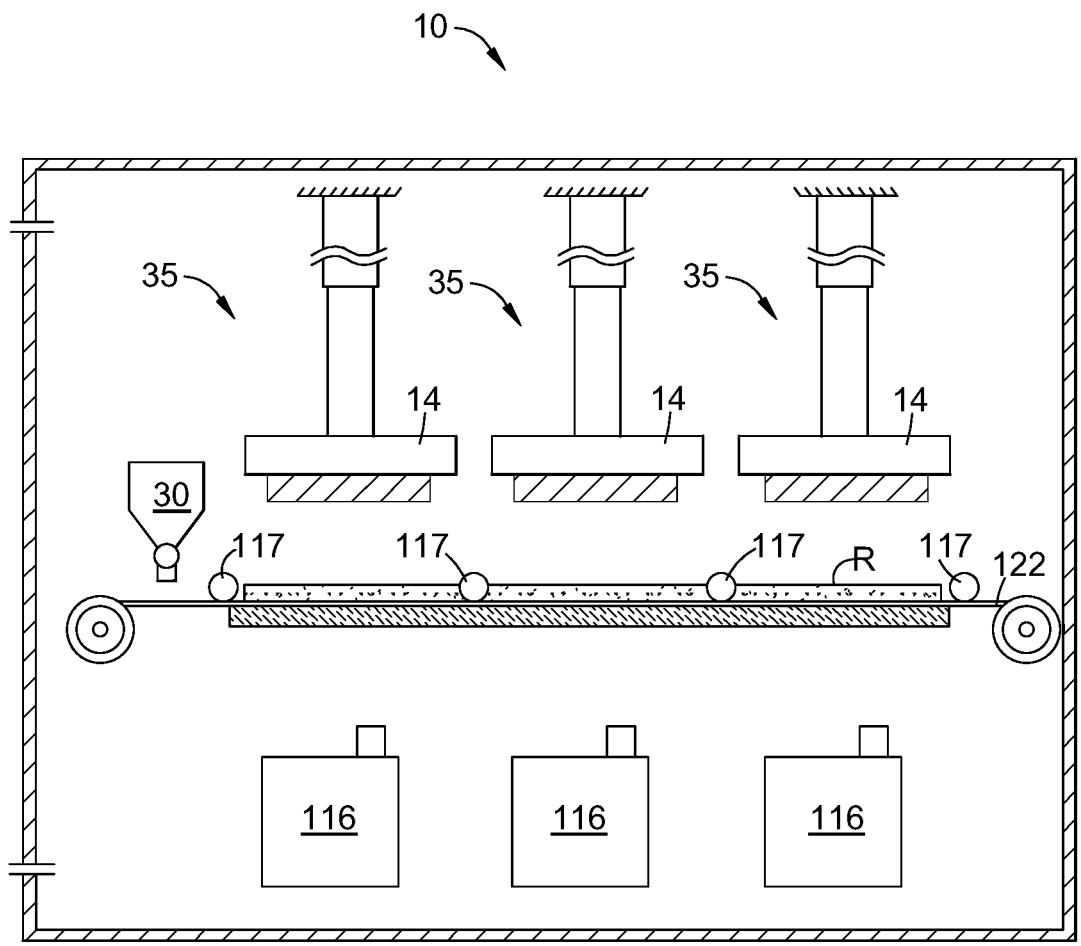
FIG. 4 is a schematic side view of an exemplary additive manufacturing apparatus having multiple build stations.

For example, FIG. 4 illustrates a machine 100 having a plurality of build stations 35 arranged in proximity to a single resin support 122 such as a foil similar to foil 22 described above. A portion of the resin support 122 is supported from underneath by a support plate 124. The machine 100 is generally similar to machine 10, and components or portions of machine 100 not specifically described may be considered to be identical to corresponding components of the machine 10. In the embodiment of FIG. 4, an individual radiant energy apparatus 116 (e.g. a projector as described above) is provided for each build station 35.

Optionally, means may be provided for controlling lift-up of the resin support 122 during the separation step of the build process (where the resin support is a foil). For example, one or more restraints 117 (e.g. long or short bars or rollers) may be provided which extend across all or some portion of the resin support 122. They may contact the resin support 122 or be positioned some distance above it. The restraints 117 may be fixed or moveable. They may extend in any direction across the resin support 122.

The build stations 35 (and associated radiant energy sources 116) may be arranged in various configurations relative to the resin support 122. Example configurations are shown in FIGS. 5-7.

Figure 5:
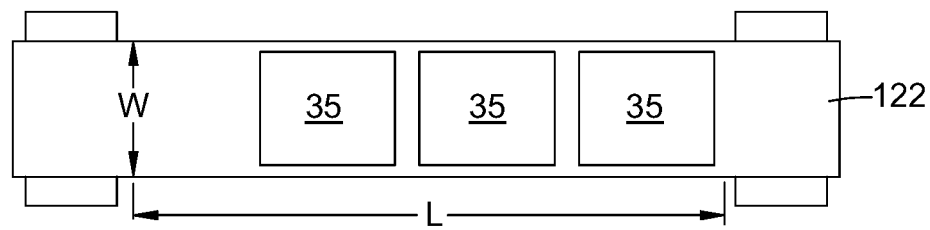
FIG. 5 is a schematic top plan view diagram showing a plurality of build stations arranged in a series configuration over a resin support.

FIG. 5 illustrates a configuration in which plurality of build stations 35 are aligned in series relative to a direction of movement of the resin support 122. This may also be described as an upstream/downstream relationship. In this configuration, the resin support 122 has an overall working length "L" sufficient to accommodate the build stations 35 plus some additional area as required for the material depositor 30. The resin support 122 has an overall width "W" wide enough to accommodate the build area of a single build station 35.

Figure 6:
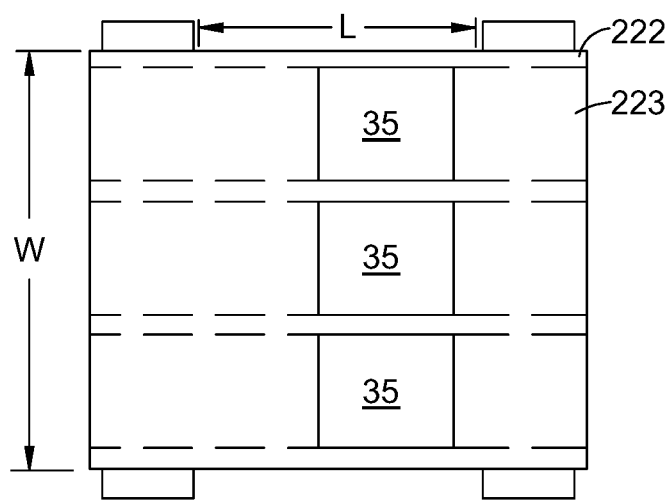
FIG. 6 is a schematic top plan view diagram showing a plurality of build stations arranged in a side-by side configuration across the width of a resin support.

FIG. 6 illustrates a configuration in which build stations 35 are aligned in parallel relative to a direction of movement of a resin support 222. This may also be described as a parallel or side-by-side relationship. In this configuration, the resin support 222 has an overall working length "L" sufficient to accommodate the length of one build station 35 plus some additional area as required for the material depositor 30. The resin support 122 has an overall width "W" wide enough to accommodate the combined width of the plurality of build stations 35.

Figure 7:
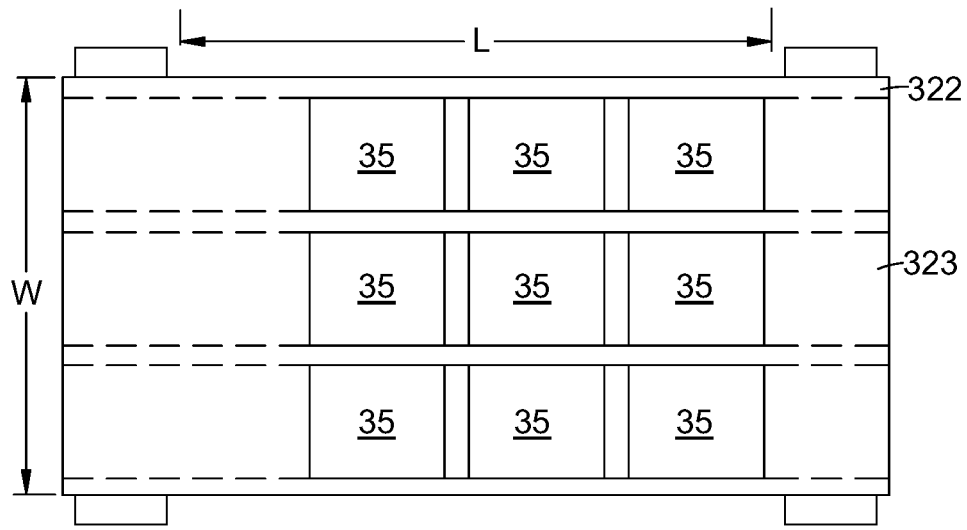
FIG. 7 is a schematic top plan view diagram showing a plurality of build stations arranged in a two-dimensional array over a resin support.

FIG. 7 illustrates a configuration which a plurality of build stations 35 are arrayed in a series-parallel relationship. This may also be described as a two-dimensional array having rows and columns. In this configuration, the resin support 322 has an overall working length "L" sufficient to accommodate the length of the plurality of build stations plus some additional area as required for the material depositor 30. The resin support 322 has an overall width "W" wide enough to accommodate the combined width of the plurality of build stations 35.

In the configurations shown in FIG. 6 or FIG. 7, resin R may be applied to the resin support 222, 322 as a series of parallel "lanes" 223, 323, respectively, where one lane 223, 323 is provided for each corresponding column of build stations 35. This avoids wasting resin R applied in the spaces between the build stations 35. Furthermore, the width of the lanes may be varied per layer in accordance with the width of the component 65 being built.

Figure 8:
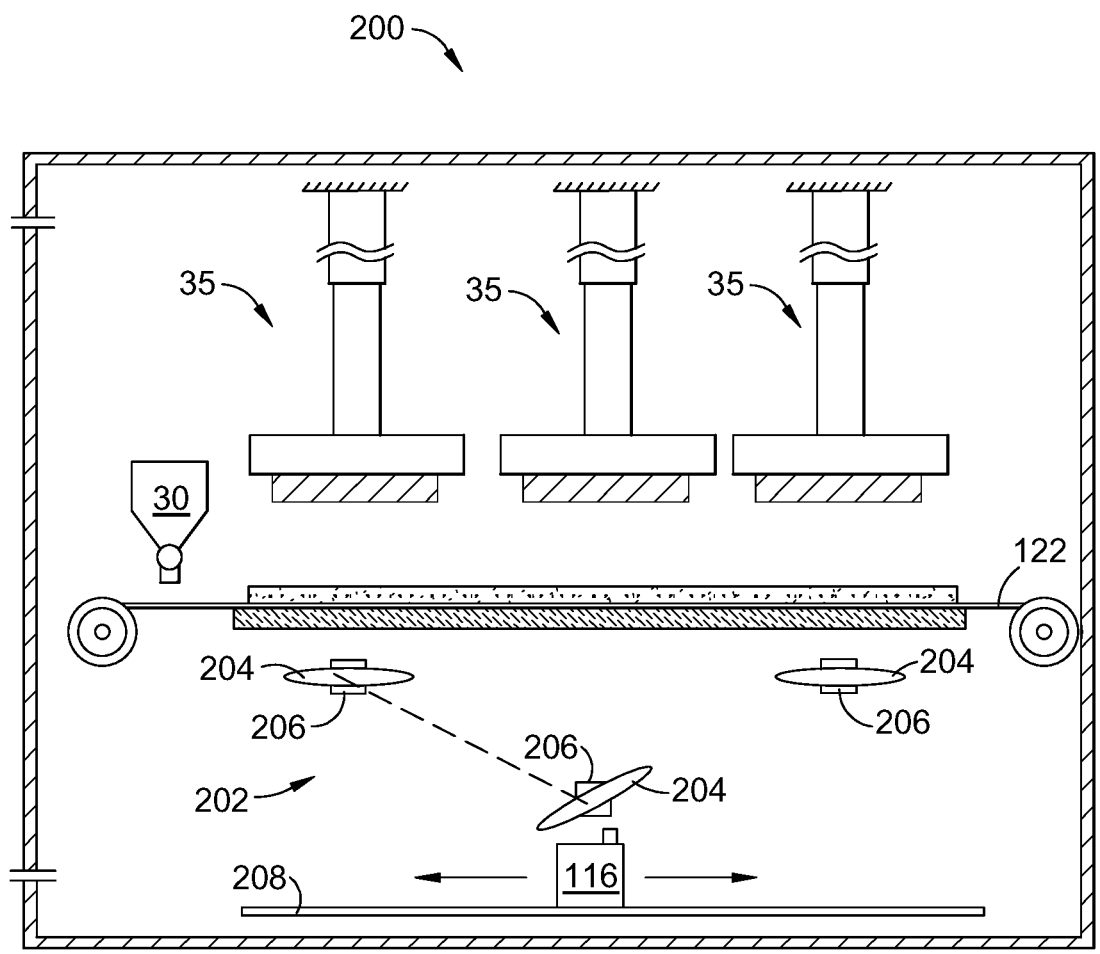
FIG. 8 is a schematic side view of an alternative embodiment of an additive manufacturing apparatus having multiple build stations.

As an alternative to providing individual radiant energy apparatuses 116, one or more radiant energy apparatuses 116 may be shared by multiple build stations 35. For example, FIG. 8 illustrates a machine 200 having a plurality of build stations 35 generally similar to machine 100 and including a resin support 122. In this embodiment, a single radiant energy apparatus 116 (e.g. a projector as described above) is provided for all of the build stations 35. The machine 200 is further provided with some image shifting means for directing radiant energy from the radiant energy apparatus 116 to the build stations 35. One possible image shifting means comprises beam steering optics 202, for example one or more lenses 204 connected to actuators 206. The beam steering optics 202 are operable to receive the patterned image from the radiant energy apparatus 116 and direct it to a selected one of the build stations 35. The operation of the beam steering optics 202 is arranged so that images can be projected to different build stations 35 sequentially or at different times.

Another possible image shifting means is physical movement of the radiant energy apparatus 116. For example, it could be mounted to an actuator 208 (e.g. a ballscrew electric actuator, linear electric actuator, pneumatic cylinder, hydraulic cylinder, or delta drive) configured to selectively move the radiant energy apparatus 116 into alignment with a selected one of the build stations 35.

Figure 9:
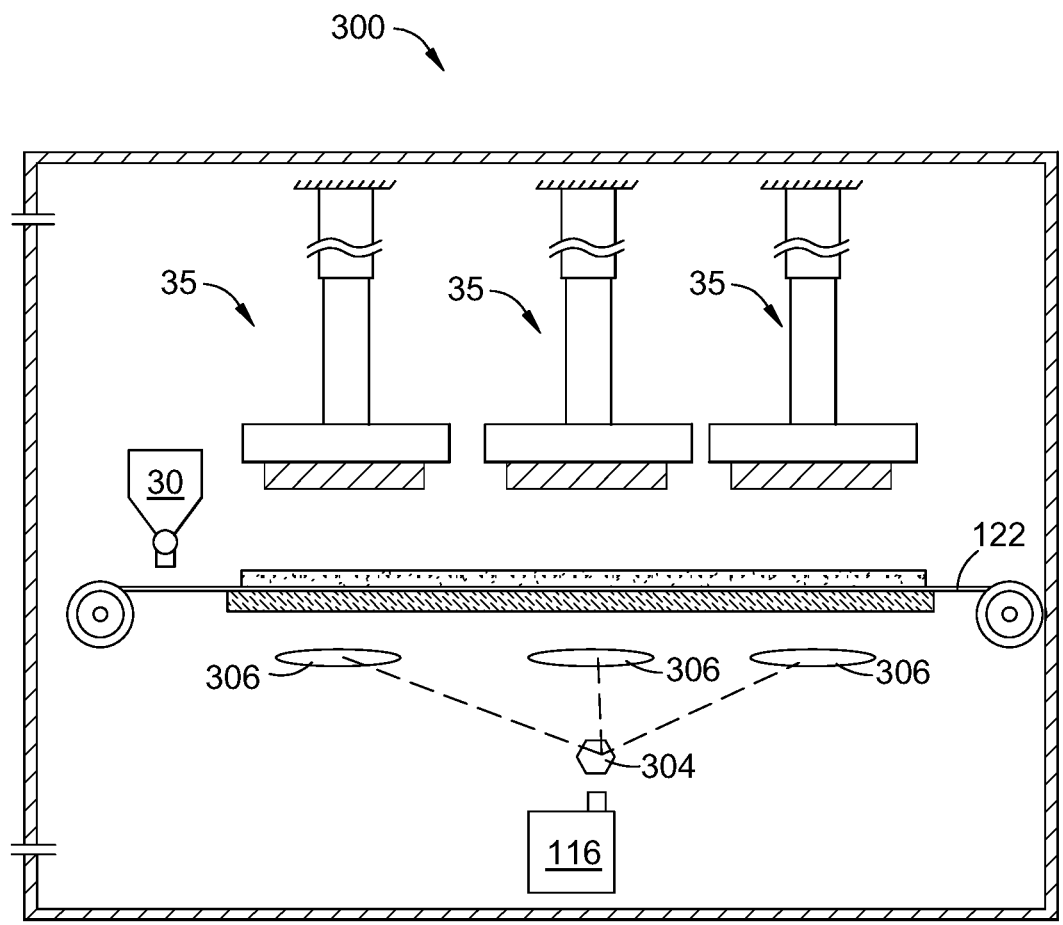
FIG. 9 is a schematic side view of an alternative embodiment of an additive manufacturing apparatus having multiple build stations.

As another alternative to providing individual radiant energy apparatuses 116, FIG. 9 illustrates a machine 300 having a plurality of build stations 35 generally similar to machine 100 and including a resin support 122. In this embodiment, a single radiant energy apparatus 116 (e.g. a projector as described above) is provided for all of the build stations 35. The machine 300 is further provided with beam splitting optics, for example one or more prisms 304 and lenses 306. The beam splitting optics are operable to receive the patterned image from the radiant energy apparatus 116 and direct it all or a group of build stations 35 simultaneously.

The concepts illustrated in FIGS. 8 and 9 can be combined in various ways. For example, the build stations 35 are configured in a two-dimensional array as shown in FIG. 7, a single radiant energy apparatus could be provided with beam splitting optics as described in FIG. 9 for a single row or column of the build stations 35. Image shifting means could then be used to align the radiant energy patterned image from the radiant energy apparatus 116 with adjacent rows or columns of the build stations 35.

The basic build cycle for machines 100, 200, 300 having multiple build stations 35 to form a component 65 is substantially as described above for each individual build station 35. However, the provision of multiple build stations 35 permits variations in the overall process cycle, in particular how the resin R is provided and cycled through the build stations 35.

Figure 10A:
FIGS. 10A-10E are sequential top view schematic diagrams showing an additive build sequence.
Figure 10B:
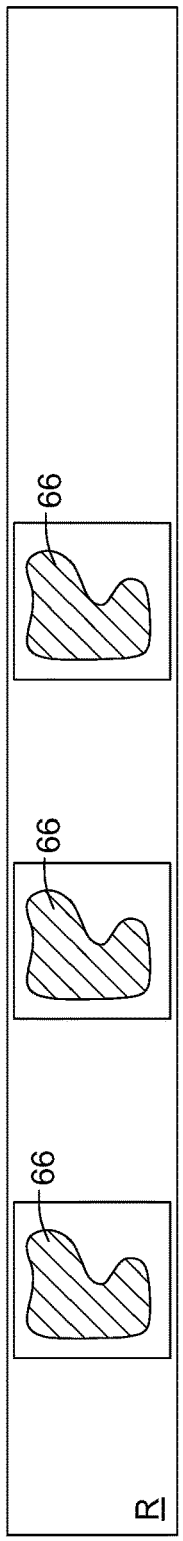
Figure 10C:
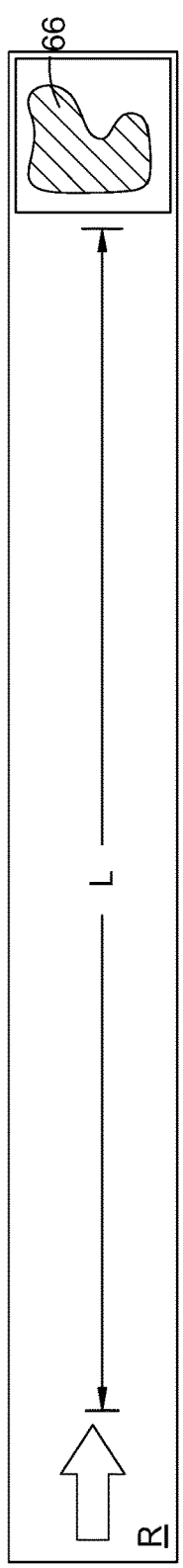
Figure 10D:
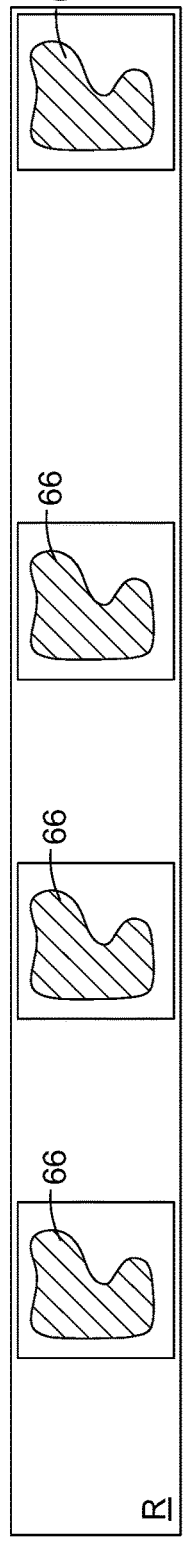
Figure 10E:
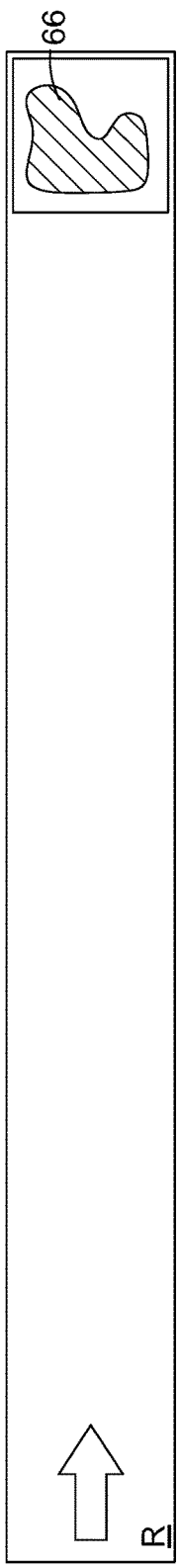

One example of the potential process is shown in FIGS. 10A-10E. FIG. 10A shows a clean layer of uncured resin R. Initially, a component layer 66 is formed by selective curing at each of the spaced-apart build stations 35, FIG. 10B. The resin support 122 is then advanced its full working length L to expose fresh uncured resin R, FIG. 10C. The selective curing at each of the spaced-apart build stations 35 is repeated as shown in FIG. 10D, followed by again advancing the resin support 122 its full working length L, FIG. 10E.

Another example of a potential cycle is shown in FIGS. 11A-11E. FIG. 11A shows a clean layer of uncured resin R. Initially, a component layer 66 is formed by selective curing at each of the spaced-apart build stations 35, FIG. 11B. The resin support 122 is then advanced and increment approximately equal to the length of one build station 35, FIG. 11C. The selective curing in each of the spaced-apart build stations 35 is repeated and shown in FIG. 11D. This results an array of cured component layers 66 spaced closely adjacent each other on the resin R. This step may be followed by advancing the resin support 122 its full working length L to expose fresh uncured resin R, FIG. 11E. This cycle spaces the component layers more closely and tends to avoid waste of resin R.

In the embodiments described above, multiple build stations 35 are provided using a single resin support 122, and single or multiple radiant energy apparatuses 116 are provided. Alternatively, an additive manufacturing machine may incorporate multiple build stations and multiple resin supports all collectively sharing one radiant energy apparatus 116.

Figure 12:
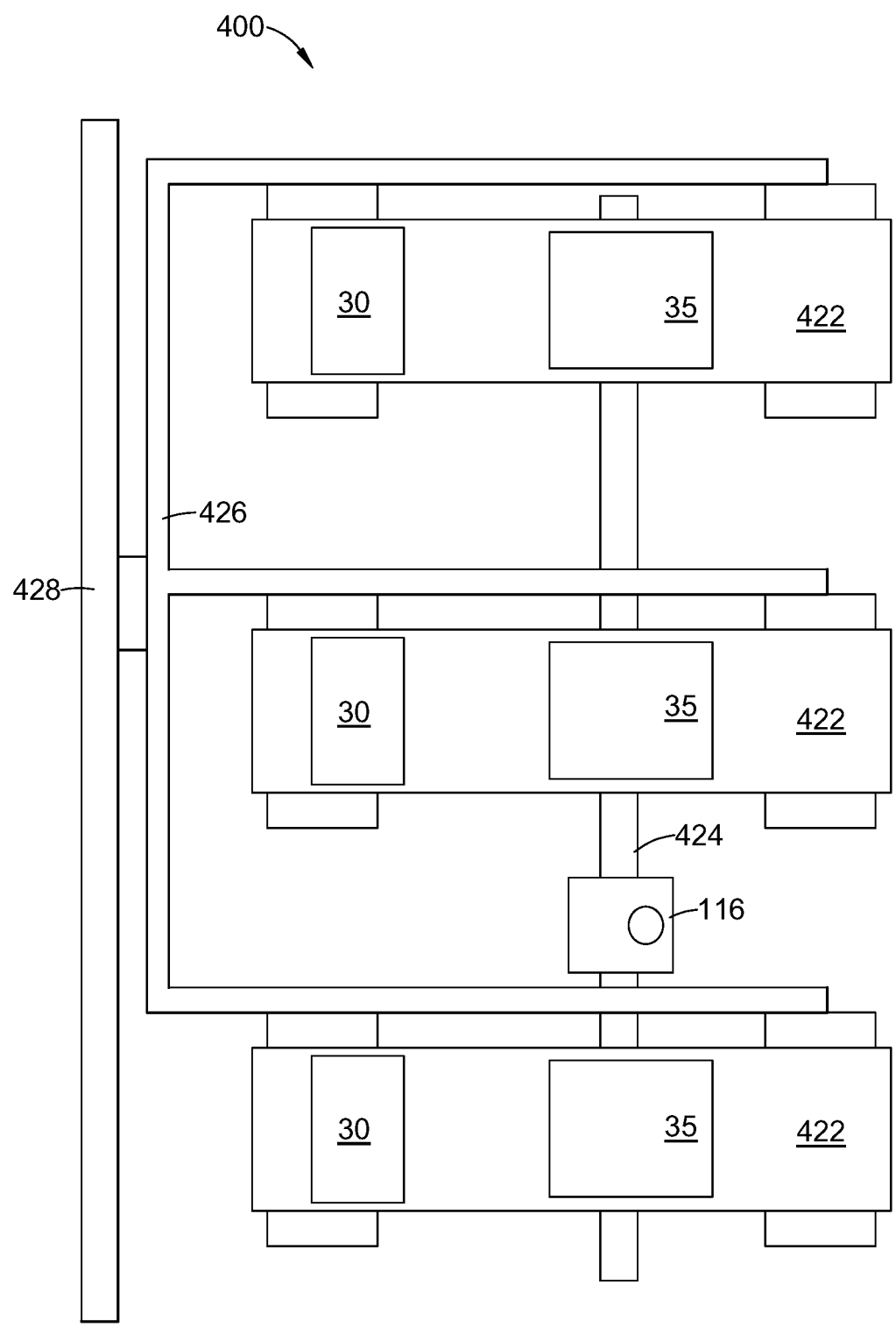
FIG. 12 is a schematic top plan view of an exemplary additive manufacturing apparatus including multiple build stations and multiple resin supports with a shared radiant energy source.

For example, FIG. 12 illustrates a machine 400 having a plurality of build stations 35 generally similar to machine 10. Each build station 35 is associated with an individual resin support 422 (e.g. foil, plate, or vat). Each resin support 422 may be provided with an individual material depositor 30, or a shared material depositor may be used. In this embodiment, a single radiant energy apparatus 116 (e.g. a projector as described above) is provided for all of the build stations 35. Means are provided for physically moving the radiant energy apparatus 116. For example, the radiant energy apparatus 116 could be mounted to an actuator 424 (e.g. a ballscrew electric actuator, linear electric actuator, pneumatic cylinder, hydraulic cylinder, or delta drive) configured to selectively move the radiant energy apparatus 116 into alignment with a selected one of the build stations 35.

Alternatively, means may be provided for moving the other components of the machine 10 (i.e. build stations 35, resin supports 22, and material depositors 30). In the illustrated example, these other components are mounted to a support frame 426 which is in turn mounted to an actuator 428. The actuator 428 is configured to selectively move the support frame 426 and attached components into alignment with the radiant energy apparatus 116.

Figure 13:
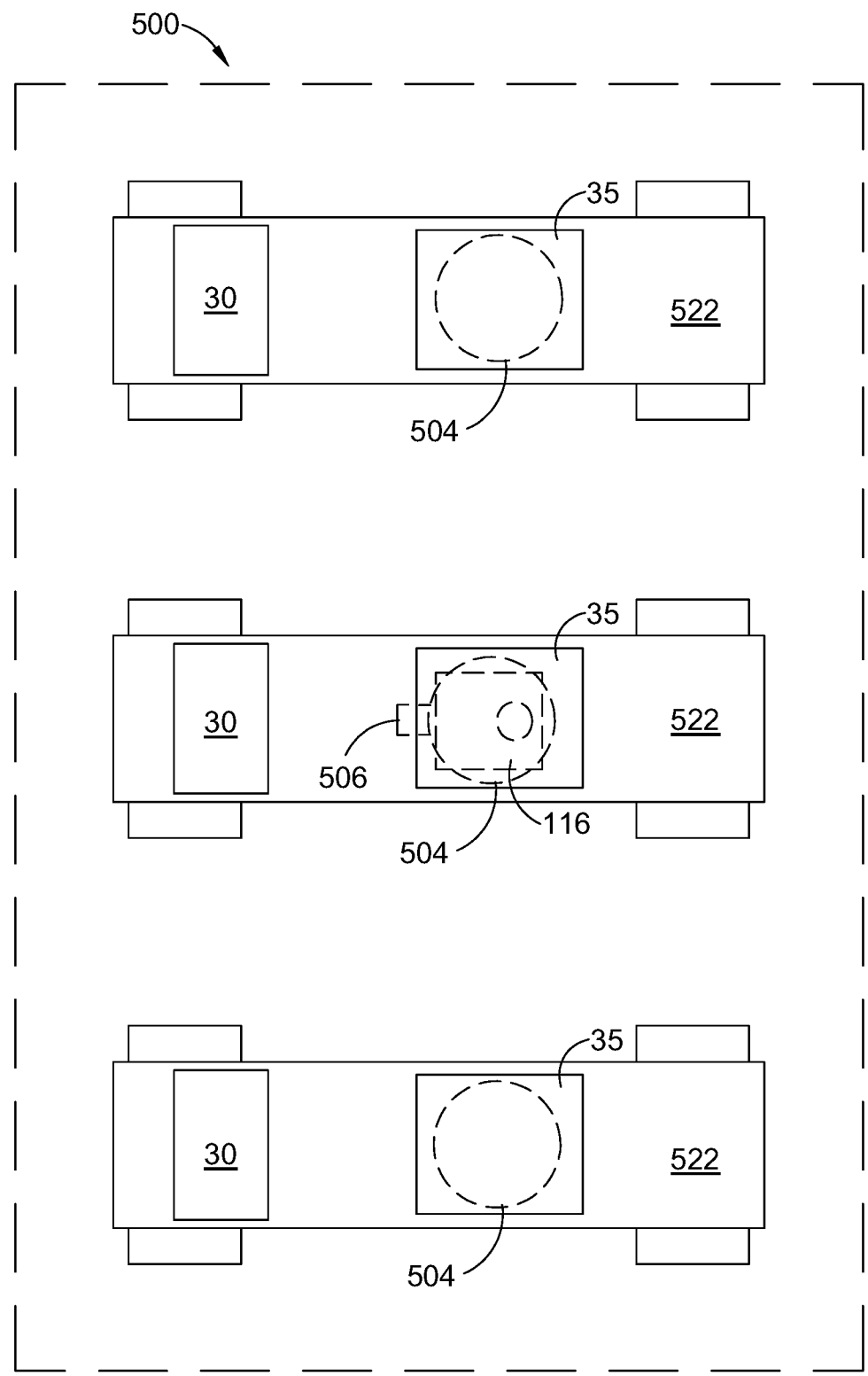
FIG. 13 is a schematic top plan view of an alternative additive manufacturing apparatus including multiple build stations and multiple resin supports with a shared radiant energy source.

As another alternative to providing individual radiant energy apparatuses 116, FIG. 13 illustrates a machine 500 having a plurality of build stations 35 generally similar to machine 10. Each build station 35 is associated with an individual resin support 522 (e.g. foil, plate, or vat). Each resin support 522 may be provided with an individual material depositor 30, or a shared material depositor may be used. In this embodiment, a single radiant energy apparatus 116 (e.g. a projector as described above) is provided for all of the build stations 35. Means are provided for directing the image. One possible image shifting means comprises beam steering optics, for example one or more lenses 504 connected to actuators 506. The beam steering optics are operable to receive the patterned image from the radiant energy apparatus 116 and direct it to a selected one of the build stations 35. The operation of the beam steering optics is arranged so that images can be projected to different build stations 35 in sequence or at different times.

Figure 14:
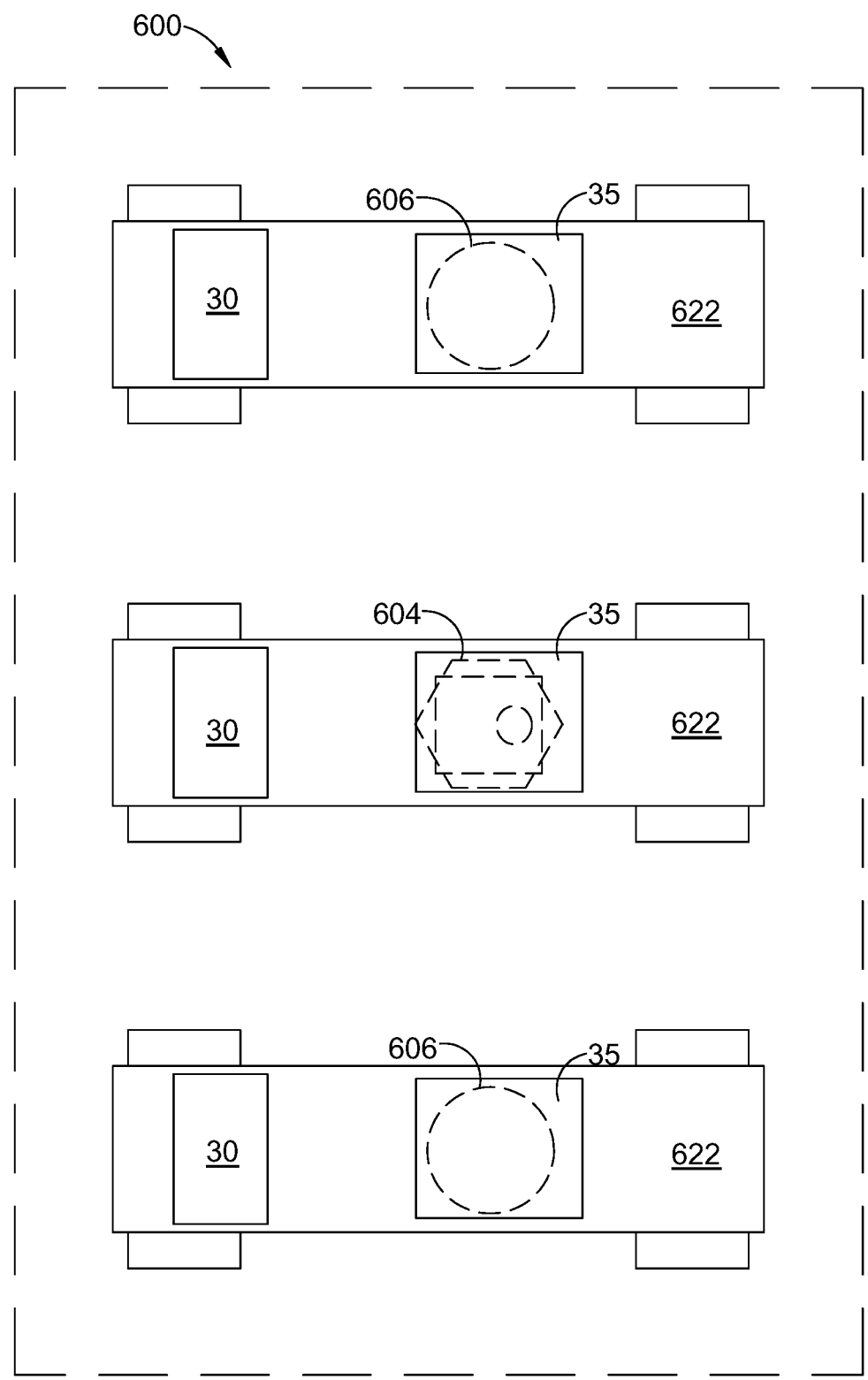
FIG. 14 is a schematic top plan view of another alternative additive manufacturing apparatus including multiple build stations and multiple resin supports with a shared radiant energy source.

As another alternative to providing individual radiant energy apparatuses 116, FIG. 14 illustrates a machine 600 having a plurality of build stations 35 generally similar to machine 10. Each build station 35 is associated with an individual resin support 622 (e.g. foil, plate, or vat). Each resin support 622 may be provided with an individual material depositor 30, or a shared material depositor may be used. In this embodiment, a single radiant energy apparatus 116 (e.g. a projector as described above) is provided for all of the build stations 35. The machine 600 is further provided with beam splitting optics, for example one or more prisms 604 and lenses 66 The beam splitting optics are operable to receive the patterned image from the radiant energy apparatus 116 and direct it all or a group of build stations 35.

For any of the embodiments described herein, the build stations 35 may be operated in unison or independently. For example, two or more stages 14 can move simultaneously, or sequentially. Optionally, one or more build stations 35 could be turned off completely for maintenance, or because they are not needed for a particular build.

The method and apparatus described herein has several advantages over the prior art. In particular, it will permit increasing additive manufacturing production rate and scale while reducing the cost and complexity of the machines.

The foregoing has described a method and apparatus for additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A tape casting additive manufacturing machine, comprising:
   two or more resin supports, each resin support comprising a tape or a foil supported by a support plate, the resin support comprising at least a portion which is transparent, wherein each resin support defines a build surface;
   a material depositor operable to deposit a resin which is radiant-energy-curable onto the resin supports;
   a build station for each resin support, each build station including:
      a stage positioned above the build surface and configured to hold a stacked arrangement of one or more cured layers of the resin; and
      one or more actuators operable to manipulate a relative position of the stage and the build surface; and
   a radiant energy apparatus disposed below the stage of each build station and operable to generate and project radiant energy in a predetermined pattern; and
   means for delivering radiant energy from the radiant energy apparatus to each of the build stations.

2. The machine of claim 1, wherein the means for delivering radiant energy comprises one or more actuators operable to physically move the radiant energy apparatus relative to the build stations.

3. The machine of claim 1, wherein the means for delivering radiant energy comprises a beam steering apparatus.

4. The machine of claim 1, wherein the means for delivering radiant energy includes beam splitting optics operable to direct radiant energy to two or more of the at least two build stations simultaneously.

5. The machine of claim 1, wherein the resin support comprises spaced-apart rollers with a flexible foil extending therebetween.

6. The machine of claim 1, further comprising a support frame, wherein:
   the two or more resin supports, the material depositor, and the build station for each resin support are mounted to the support frame; and
   the support frame is mounted to an actuator configured to selectively move the support frame into alignment with the radiant energy apparatus.

7. The machine of claim 1, wherein the resin comprises a filler.

8. A method for producing a component layer-by-layer, comprising:
   providing a tape casting additive manufacturing machine including:
      two or more resin supports, each resin support comprising a tape or a foil supported by a support plate, the resin support comprising at least a portion which is transparent, wherein each resin support defines a build surface;
      a build station for each resin support, each build station including:
         a stage positioned above the build surface and configured to hold a stacked arrangement of one or more cured layers of a radiant-energy-curable resin; and
         one or more actuators operable to manipulate a relative position of the stage and the build surface;
      a radiant energy apparatus disposed below the stage of each build station and operable to generate and project radiant energy in a predetermined pattern; and
      means for delivering radiant energy from the radiant energy apparatus to each of the build stations;
   executing a build cycle, including the steps of:
      depositing on the build surfaces the resin;
      positioning each of the stages relative to the corresponding build surfaces so as to define a layer increment in the resin on the build surface;
      selectively curing the resin on the build surface using an application of radiant energy in a specific pattern so as to define the geometry of a cross-sectional layer of a component for each of the stages;
      moving the build surfaces and the stages relatively apart so as to separate the components from the build surfaces; and
      repeating the cycle, for a plurality of layers, until the components are complete.

9. The method of claim 8, wherein the radiant energy is delivered by shifting radiant energy from the single radiant energy apparatus to the at least two build stations at different times.

10. The method of claim 8, wherein the radiant energy is delivered by physically moving the radiant energy apparatus relative to the at least two build stations.

11. The method of claim 8, wherein the radiant energy is delivered by a beam steering apparatus.

12. The method of claim 8, wherein the radiant energy is delivered by splitting radiant energy from the single radiant energy apparatus and directing it to the at least two build stations simultaneously.

13. The method of claim 8, wherein a material combination of the resin is changed at least once during the build.

14. The method of claim 8, wherein the machine further comprises a support frame, wherein:
   the two or more resin supports and the build station for each resin support are mounted to the support frame; and
   the support frame is mounted to an actuator configured to selectively move the support frame into alignment with the radiant energy apparatus.

15. The method of claim 14, further comprising:
   moving the support frame to align a first resin support and the build station for the first resin support with the radiant energy apparatus; and
   selectively curing the resin on the build surface of the first resin support.

16. The method of claim 15, further comprising:
   moving the support frame to align a second resin support and the build station for the second resin support with the radiant energy apparatus; and
   selectively curing the resin on the build surface of the second resin support.

17. The method of claim 8, wherein the machine further comprises a material depositor operable to deposit the resin on the build surfaces.

18. The method of claim 8, wherein the machine further comprises a material depositor for each resin support, each material depositor operable to deposit the resin on the build surface of a respective resin support.

19. The method of claim 8, wherein each of the two or more resin supports comprises spaced-apart rollers with a flexible foil extending therebetween.

20. The method of claim 8, wherein the resin comprises a filler.

\* \* \* \* \*

UNITED STATES PATENT AND TRADEMARK OFFICE
CERTIFICATE OF CORRECTION

PATENT NO. : 11,707,888 B2
APPLICATION NO. : 17/505932
DATED : July 25, 2023
INVENTOR(S) : Meredith Elissa Dubelman et al.

It is certified that error appears in the above-identified patent and that said Letters Patent is hereby corrected as shown below:

On the Title Page

In page 2, Column 1, item (56), U.S. patent documents, cite no. 8, delete "Weiss et al." and insert --Tada et al.--, therefor.

In page 2, Column 1, item (56), U.S. patent documents, cite no. 11, delete "Mmquist et al." and insert --Almquist et al.--, therefor.

In page 2, Column 1, item (56), U.S. patent documents, cite no. 18, delete "Mmquist et al." and insert --Almquist et al.--, therefor.

In page 2, Column 2, item (56), U.S. patent documents, cite no. 12, delete "San" and insert --Sarr--, therefor.

In page 2, Column 2, item (56), U.S. patent documents, cite no. 61, delete "Balistrer et al." and insert --Balistreri et al.--, therefor.

In page 2, Column 2, item (56), U.S. patent documents, cite no. 64, delete "Koo et al." and insert --Yoo et al.--, therefor.

In page 3, Column 1, item (56), U.S. patent documents, cite no. 41, delete "Mlanic" and insert --Allanic--, therefor.

In page 3, Column 1, item (56), U.S. patent documents, cite no. 55, delete "Koo et al." and insert --Yoo et al.--, therefor.

In page 3, Column 2, item (56), U.S. patent documents, cite no. 72, delete "Kune" and insert --Kunc et al.--, therefor.

Signed and Sealed this
Twelfth Day of December, 2023

Katherine Kelly Vidal
*Director of the United States Patent and Trademark Office*